United States Patent [19]
Carlin et al.

[11] Patent Number: 5,467,689
[45] Date of Patent: Nov. 21, 1995

[54] HYDRAULIC CYLINDER AND BIASED WEAR RING ASSEMBLY FOR USE THEREIN

[75] Inventors: Jerry F. Carlin, Mound; James E. Koon, Chanhassen, both of Minn.; Paul D. Parker; Warren L. Thompson, both of Ankeny, Iowa

[73] Assignee: Eaton Corporation, Cleveland, Ohio

[21] Appl. No.: 329,054

[22] Filed: Oct. 26, 1994

Related U.S. Application Data

[63] Continuation of Ser. No. 751,382, Aug. 28, 1991, abandoned.

[51] Int. Cl.⁶ .................. F16J 1/00; F16J 9/06; F02F 5/00
[52] U.S. Cl. .................. 92/172; 277/70; 277/165; 277/221; 277/222
[58] Field of Search .................. 92/162 R, 172; 277/165, 70, 78, 79, 221, 222

[56] References Cited

U.S. PATENT DOCUMENTS

| | | | |
|---|---|---|---|
| 1,702,294 | 2/1929 | Du Bois | 277/222 X |
| 2,048,258 | 7/1936 | Godron | 277/78 |
| 3,582,094 | 6/1971 | Whittaker | 277/165 X |
| 3,636,824 | 1/1972 | Clark | 277/165 X |
| 3,642,248 | 2/1972 | Benware | 251/175 X |
| 3,814,445 | 6/1974 | Bitzan | 277/165 |
| 3,832,852 | 9/1974 | Schmucker | 92/61 X |
| 3,885,800 | 5/1975 | Sievenpiper | 277/165 |
| 4,104,904 | 8/1978 | Yaguchi et al. | 91/399 X |
| 4,365,671 | 12/1982 | Long | 166/318 |
| 4,714,259 | 12/1987 | Mack et al. | 277/165 |
| 4,819,952 | 4/1989 | Edlund | 277/165 |
| 4,867,460 | 9/1989 | Colo et al. | 277/205 X |
| 5,083,499 | 1/1992 | Elvingsson | 277/165 X |

*Primary Examiner*—John E. Ryznic
*Attorney, Agent, or Firm*—L. J. Kasper

[57] ABSTRACT

A linear hydraulic cylinder (11) is provided of the type having a cylinder barrel (13;113) and a piston (21;121) reciprocally disposed in the barrel. There is a main piston seal member (55) which seals between the piston and an interior surface (37) of the cylinder barrel. Disposed adjacent the piston seal is a wear ring (61;161) defining a substantially cylindrical outer surface (67) bounded by a pair of substantially square corners (66). A loader member (69) biases the wear ring into sufficiently tight engagement with the interior surface of the barrel to prevent passage of contaminant particles between the surface and the wear ring. The result is substantially reduced cylinder "drift" in the presence of contaminant particles.

7 Claims, 3 Drawing Sheets

HYDRAULIC CYLINDER AND BIASED WEAR RING ASSEMBLY FOR USE THEREIN

This application is a continuation of application Ser. No. 07/751,382, filed Aug. 28, 1991, abandoned.

BACKGROUND OF THE DISCLOSURE

The present invention relates to high pressure linear hydraulic cylinders, and-more particularly, to such cylinders having an improved main piston seal and wear ring assembly.

Many hydraulic cylinders of the type to which the present invention relates are used on agricultural vehicles. One particular use is in connection with implement depth control systems wherein there are typically two hydraulic cylinders, connected hydraulically in series, to control the depth (relative to the ground) of the particular element, such as a plow or disc.

The hydraulic cylinders used in implement depth control systems are typically of the single rod type, such that the fluid displacement of the cylinder is different when the cylinder is being extended than when the cylinder is being retracted. As a result, if there is internal leakage in one of the cylinders, past the piston, the result is that one cylinder retracts slightly, while the other cylinder extends an approximately equal amount. This causes erratic and inconsistent depth control across the width of the implement.

In reviewing a number of the cylinders from systems in which erratic and inconsistent depth control occurred, what was observed was a pattern of scratches or scuffing on the cylindrical, internal surface of the cylinder barrel, with most of the scratch pattern coinciding with the piston wear ring. As one step in the development of the present invention, it was hypothesized that the scratch pattern was the result of contamination particles lodging between the wear ring and the cylinder barrel, and traveling with the wear ring (actually embedded in the wear ring), and thus causing the scratch pattern, and resulting in leakage.

SUMMARY OF THE INVENTION

Accordingly, it is an object of the present invention to provide an improved high pressure hydraulic cylinder which substantially reduces the occurrence of a scuffing or scratch pattern on the interior of the cylinder barrel, in response to the presence of contaminant particles within the cylinder.

The above and other objects of the present invention are accomplished by the provision of an improved linear hydraulic cylinder of the type including a cylinder barrel, first closure means cooperating with the cylinder barrel to define a head end and a fluid inlet port, and second closure means cooperating with the cylinder barrel to define a rod end and a fluid outlet port. A piston assembly is reciprocally disposed within the cylinder barrel, and includes a piston cooperating with an interior, cylindrical surface of the cylinder barrel and the first and second closure means to define a head end fluid chamber and a rod end fluid chamber. The piston assembly further includes a rod member fixed to the piston and extending through a rod opening in the second closure means. The piston includes an outer, generally cylindrical surface closely spaced apart from the interior surface of the cylinder barrel, the outer cylindrical surface defining first and second annular grooves disposed adjacent the head end and rod end fluid chambers, respectively. A wear ring is disposed in the first annular groove and a seal assembly is disposed in the second annular groove.

The improved hydraulic cylinder is characterized by the wear ring comprising a generally annular, split ring member defining a substantially cylindrical outer surface bounded by a pair of substantially square corners. A loader member is disposed in the first annular groove, and is operable to bias the wear ring into sufficiently tight engagement with the interior cylindrical surface of the cylinder barrel, substantially to prevent contaminant particles between the interior surface and the wear ring.

BRIEF DESCRIPTION OF THE DRAWINGS

FIG. 4 is a further enlarged, fragmentary, axial cross-section, similar to FIG. 3, illustrating the invention in greater detail.

FIG. 5 is a similarly enlarged, fragmentary plan view of one portion of the wear ring of the present invention.

DESCRIPTION OF THE PREFERRED EMBODIMENTS

Figure 1:
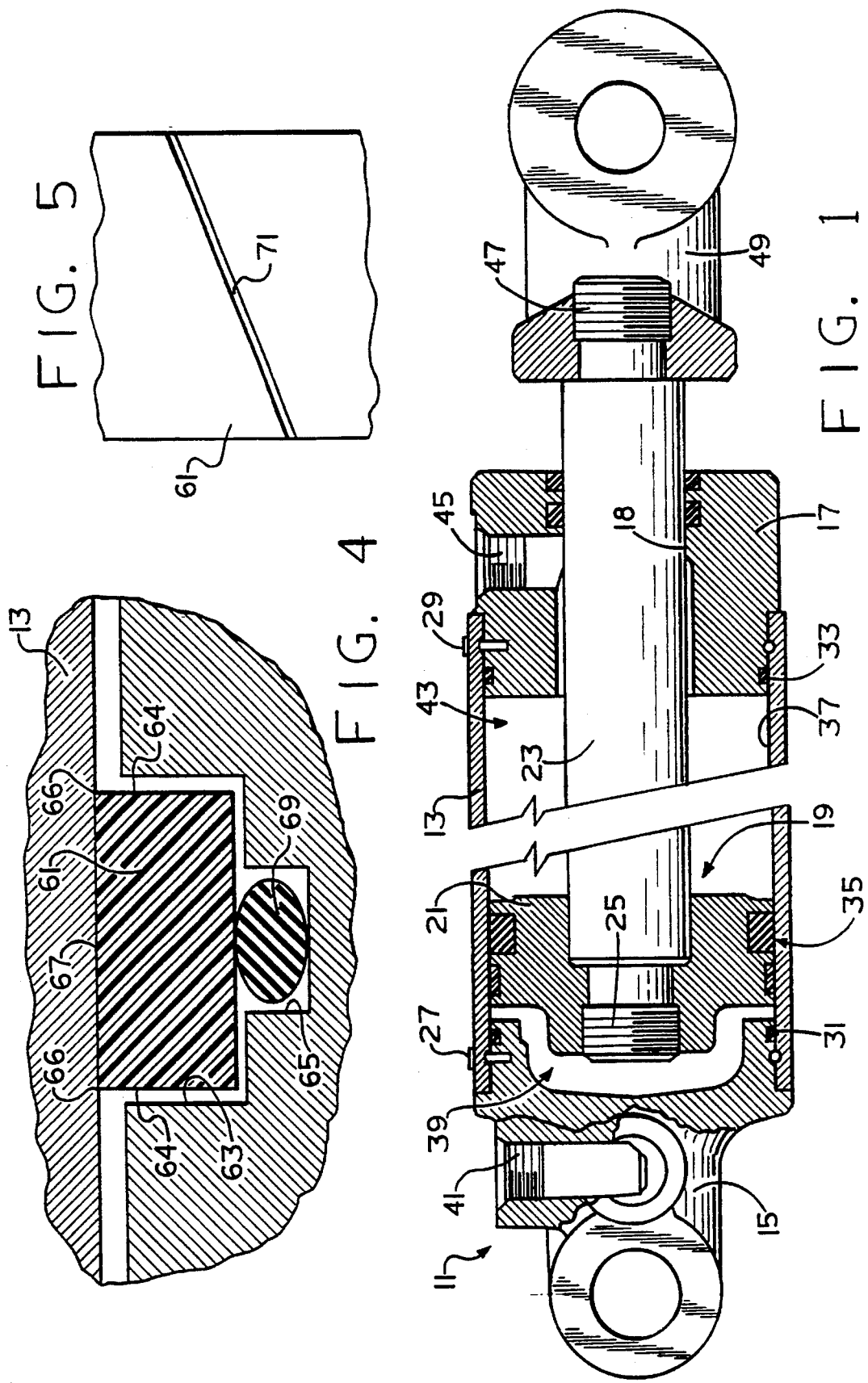
FIG. 1 is a broken, axial cross-section of an hydraulic cylinder of the type to which the present invention may be applied.

Referring now to the drawings, which are not intended to limit the invention, FIG. 1 illustrates a double-acting, linear hydraulic cylinder, generally designated 11, of the type with which the present invention may be utilized. Although the present invention is not limited to any particular configuration or construction of hydraulic cylinder, except as noted hereinafter, and in the appended claims, the invention is especially well suited for use in a cylinder of the type illustrated and described in U.S. Pat. No. 4,192,225, assigned to one of the assignees of the present invention, and incorporated herein by reference.

The cylinder 11 includes a barrel 13 closed at one end by a head 15, and closed at the other end by a bearing 17 defining a rod opening 18. Axially reciprocating within the barrel.13 is a piston assembly 19, including a piston member 21 attached to a piston rod 23 by means of a set of external threads 25 on a reduced diameter portion of the piston rod 23, the threads 25 being in engagement with a set of mating internal threads defined by the piston 21.

The head 15 is fixed to the barrel 13 by means of a lock ring 27. Similarly, the bearing 17 is fixed to the barrel 13 by means of a lock ring 29. The lock rings 27 and 29 may be of the type illustrated and described in the above-incorporated U.S. Pat. No. 4,192,225, such lock rings now being well known to those skilled in the art. Briefly, the function of the lock rings 27 and 29 is to attach the two associated members (e.g., the barrel 13 and head 15) in such a manner that there is neither relative axial motion, nor relative rotational motion therebetween.

Disposed between the barrel 13 and the head 15, and adjacent the lock ring 27, is an O-ring and backup washer assembly 31. Similarly, between the barrel 13 and the bearing 17, and adjacent the lock ring 29 is an O-ring and backup washer assembly 33. Disposed in an annular groove defined by the piston 21 is a main piston seal assembly, generally designated 35, the primary function of which is to prevent the flow of pressurized fluid past the piston member 21, along an interior, cylindrical surface 37 of the barrel 13. The main piston seal assembly 35 is illustrated only generically in FIG. 1, but is illustrated in greater detail in FIG. 2.

The barrel 13 cooperates with the head 15 and the piston 21 to define a head end fluid chamber 39, which is adapted to receive pressurized fluid, during a normal lifting operation (i.e., moving the piston 21 to the right in FIG. 1), by means of a fluid inlet port 41. Similarly, the barrel 13 cooperates with the bearing 17 and the piston member 21 to define a rod end fluid chamber 43, from which fluid is discharged during a normal lifting operation through a fluid outlet port 45.

The piston rod includes another reduced diameter portion (toward its right end in FIG. 1), which defines a set of external threads 47, which are in threaded engagement with a set of internal threads defined by a rod end member 49. The rod end member 49 would typically be attached to a portion of a device, such as an implement, which is to be lifted.

Figure 2:
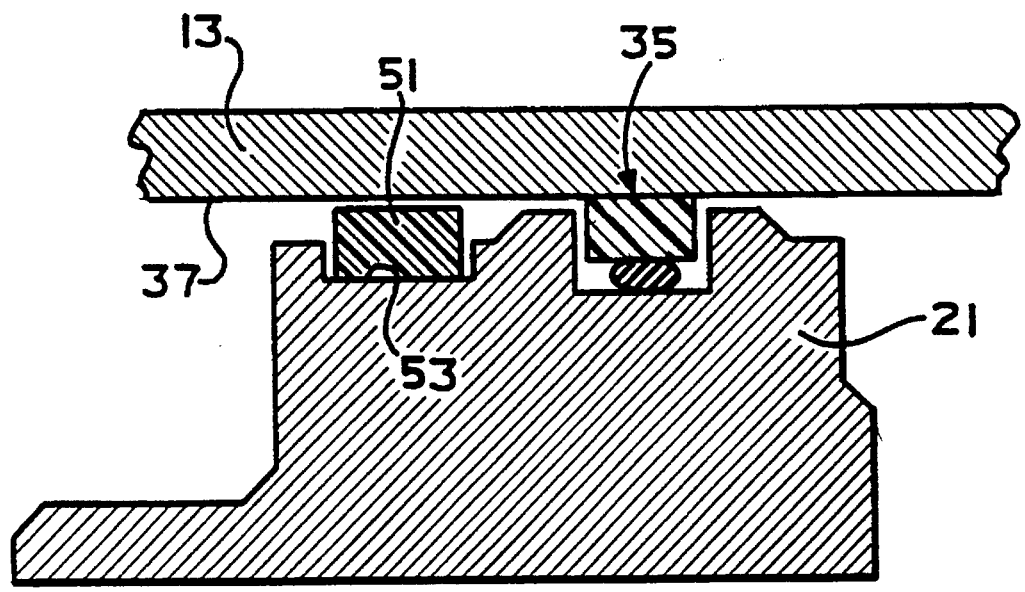
FIG. 2 is an enlarged, axial cross-section, similar to FIG. 1, illustrating the "prior art".

Referring now to FIG. 2, there is illustrated a typical, prior art arrangement of a main piston seal assembly 35 and a wear ring 51. The wear ring 51 is received within an annular groove 53 defined by the piston member 21. As is well known to those skilled in the art, the primary function of the prior art wear ring 51, which typically comprises a split, molded member, is to act as a bearing member, and prevent metal-to-metal engagement between the piston 21 and the interior surface 37 of the barrel 13, as the piston moves radially. The prior art wear ring 51 has typically comprised a suitable glass-filled polyamide, such as that sold commercially by DuPont under the trademark Zytel®. The prior art wear ring 51 was used "as-molded", and therefor, it was typical for the wear ring to have somewhat rounded corners. One of the prior art wear rings used commercially by one of the assignees of the present invention was allowed to have a 0.050 inch maximum radius at each of the inside corners, and at each of the outside corners.

It has been discovered during the development of the present invention that one of the problems associated with the prior art arrangement illustrated in FIG. 2 is that contaminant particles in the hydraulic fluid would become entrapped between the outer surface of the wear ring 51 and the interior surface 37 of the barrel 13. Such contaminant particles would then become embedded in the outer surface of the wear ring 51, and thus, upon reciprocation of the piston assembly, such particles would cut small scratches in the interior surface 27. These scratches would then serve as leak passages from the pressurized fluid chamber 39 to the fluid chamber 43, thus permitting the piston assembly 19 to "drift", i.e., move downward (to the left in FIG. 1) under load.

Figure 3:
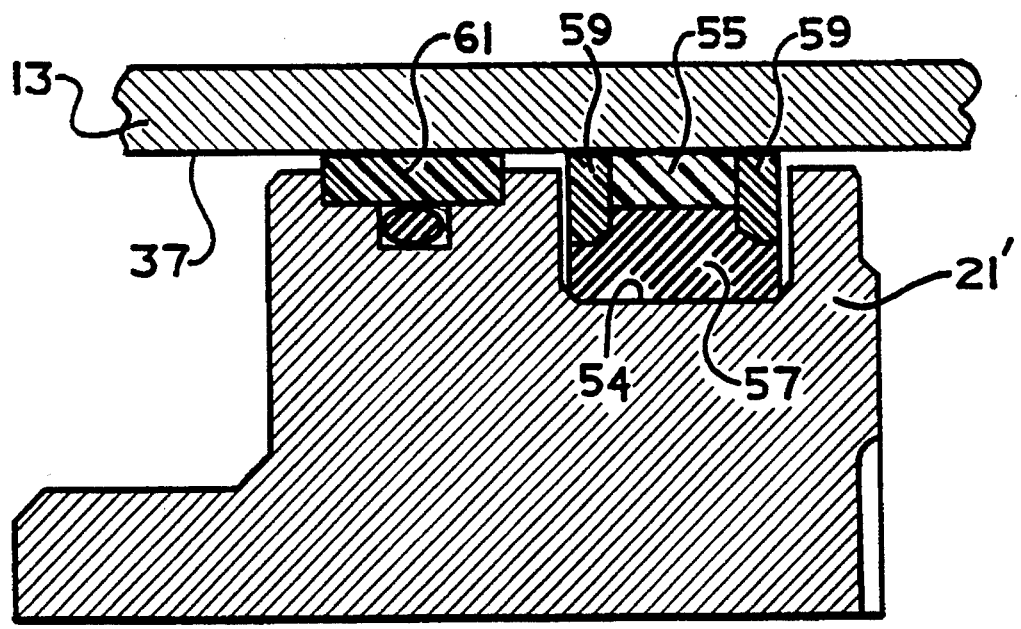
FIG. 3 is a view similar to FIG. 2, illustrating the piston and wear ring assembly of the present invention.

Referring now primarily to FIGS. 3 and 4, there is illustrated a main piston seal assembly and wear ring assembly, in accordance with the present invention. Although the configuration of the main piston seal assembly forms no part of the present invention, the main piston seal assembly which is shown in FIG. 3 is the one which is considered the preferred embodiment of the present invention, as of the time of filing of the present application. The main piston seal include an annular groove 54 in which is disposed a generally rectangular cross-section slipper seal member 55, supported and biased radially outwardly by an elastomeric loader member 57. On opposite axial ends of the slipper seal member 55 is a pair of plastic back-up rings 59, the function of which is to prevent extrusion of the slipper seal member 55, when subjected to substantial pressure.

Referring now primarily to FIG. 4, the wear ring assembly of the present invention includes a wear ring 61 which is disposed in a stepped, annular groove 63, including a smaller groove portion 65. The wear ring 61 may be molded in generally the same manner as the prior art wear ring 51, and may comprise substantially the same material as the prior art wear ring 51. However, it is one important aspect of the present invention that the wear ring 61 not only serves as a bearing between a somewhat modified piston 21' and the barrel 13, but in addition, is able to avoid having contaminant particles embedded therein, between the wear ring and the interior surface 37 of the barrel 13.

Accordingly, the wear ring 61 of the present invention is not used in its as-molded condition, but instead, a pair of axial end surfaces 64 and an outer surface 67 are machined to have substantially square corners 66 at either axial end of its outer surface 67. The outer surface 67 is machined to be substantially cylindrical, rather than being somewhat crowned or curved as was typically the case when the prior art wear ring 51 was used in the as-molded condition.

Reference to the corners 88 of the wear ring 61 being "substantially square" should be understood by those skilled in the art to mean square within the normal machining capability of the type of equipment which would be used to machine (lathe cut) a glass-filled polyamide. By way of example only, in the commercial embodiment of the present invention which has been developed, the outer corners 66 of the wear ring 61 are required to have a maximum radius of curvature of 0.004 inches, although in certain applications a somewhat larger radius of curvature may still suffice for the intended purpose. Reference to the outer surface 67 as being "substantially cylindrical" will also be understood by those skilled in the art to mean cylindrical within normal machining capability. The purpose of the corners 66 being substantially square and the outer surface 67 being generally cylindrical will become apparent subsequently.

Disposed in a smaller groove portion 65 is an elastomeric loader ring 69 which appears in FIG. 4 as having a generally oval shape. However, the loader ring 69 is initially of generally circular cross-section, but is sufficiently compressed as a result of the assembly of the wear ring 61 such that the loader ring 69 has the cross-section shown in FIG. 4. Alternatively, the loader ring could have a square cross-section, although an O-ring would typically be less expensive. The loader ring 69 may comprise the same elastomeric material as the loader member 57 used in the main piston seal assembly. For example, the loader ring 69 may comprise a rubber compound, such as a nitrile or urethane rubber, and it is believed that one skilled in the art would be able to select an appropriate material for the loader ring 69 upon a reading and understanding of this specification.

Referring again to FIG. 2, it may be seen that the prior art wear ring 51 is shown touching the annular groove 53 of the piston 21, but only because the wear ring 51 is a "split ring" which inherently tends to close and engage whatever surface it surrounds, although not with any substantial engagement force. By way of contrast, the wear ring 61 of the present invention is loaded or biased radially outwardly by the loader ring 69 into tight engagement with the interior surface 37. The combination of the biasing by the loader ring 69, and the square corners 66 and the cylindrical outer surface 67 enable the wear ring 61 to still perform its function as a bearing, but in addition, prevent contaminant particles from passing between the outer surface 67 and the interior surface 37. In other words, the square-corner configuration of the wear ring 61 is able to "wipe" contaminant particles as the wear ring 61 moves axially along the interior surface 37. Such wiping action of the wear ring 61 prevents contaminant particles from becoming embedded in the outer surface 67, which would permit such particles to cut leakage grooves in the interior surface 37, permitting high pressure fluid to leak from the head end fluid chamber 39 to the rod end fluid chamber 43 when the inlet port 41 is pressurized.

Referring now to FIG. 5, one additional aspect of the present invention will be described. In the prior art, wear ring 51 would define an angled gap having a gap width of approximately 0.250 inches to about 0.375 inches, when used with a barrel having a nominal inside diameter of 3 inches. The wear ring 61 of the present invention defines a gap 71 having a gap width in the range of about 0.062 inches to about 0.125 inches. The reason for the substantially narrower width of the gap 71 is related to the fact that the prior art wear ring 51 was merely a bearing, whereas the wear ring 61 of the present invention serves as both a bearing and a seal or wiper member. In addition, the wear ring 61 should be installed such that the angled gap 71 is oriented "upward" or "on top", such that contaminant particles, which are inherently heavy, will sink, rather than passing through the gap 71.

DRIFT SPECIFICATION

In order to evaluate the functional performance of hydraulic cylinders, one of the assignees of the present invention has developed various drift specifications and test methods associated therewith. By "drift" is meant the undesirable movement (either extension or retraction) of the piston assembly of a cylinder when operating under "load holding" conditions. The quantitative specification which has been established is that the drift must not exceed 0.0035 inches of rod travel per minute.

In testing for excessive drift, the assignee of the invention has developed an accelerated test in which any likely wear or deterioration of functional performance is "accelerated" by the addition of contaminant particles (e.g., iron filings, sand, etc.). The assignee of the invention specifies a maximum system contaminant level for any systems including hydraulic cylinders manufactured by the assignee. In order to perform a comparison test, with and without the present invention, and to do so on an accelerated basis, the tests performed by the assignee had the contaminant levels intentionally increased to anywhere from 100 to 200 times the assignee's standard specification.

The drift test performed on each cylinder sample involves putting the contaminant particles in the head end fluid chamber 39, through the inlet port 41, then connecting the inlet port 41 to the pressure source. The test set up includes an accumulator, such that the cylinder may be cycled (first extend the rod end 49, then retract it to the position shown in FIG. 1) without the contaminant ever leaving the head end fluid chamber 39.

As the cylinder is being cycled, the drift is measured periodically, to determine the number of cycles of operation which could occur before the cylinder would have excessive drift, i.e., greater than 0.0035 inches per minute of rod travel.

All of the drift testing was performed with a pressure in the head end fluid chamber 39 of 2500 psi. The test results were as follows: with the prior art wear ring assembly as shown in FIG. 2, approximately ⅓ of the cylinder samples tested had excessive drift after anywhere from 1000 to 2000 cycles. However, with the wear ring assembly of the present invention (FIGS. 3 and 4, none of the cylinder samples had excessive drift after a minimum of 9000 cycles.

ALTERNATIVE EMBODIMENT

Figure 7:
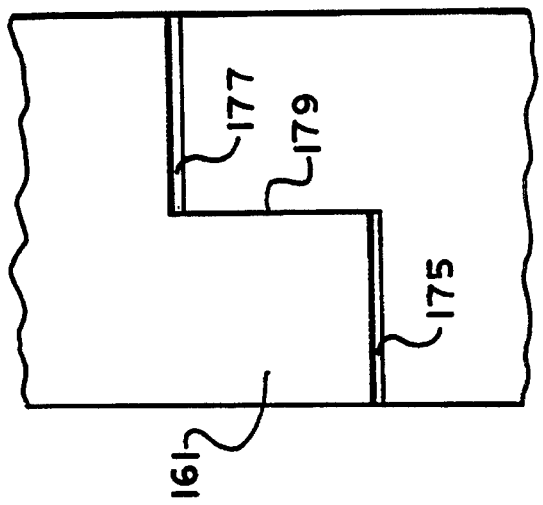
FIG. 7 is a similarly enlarged, fragmentary plan view of one portion of the wear ring of the alternative embodiment.
Figure 8:
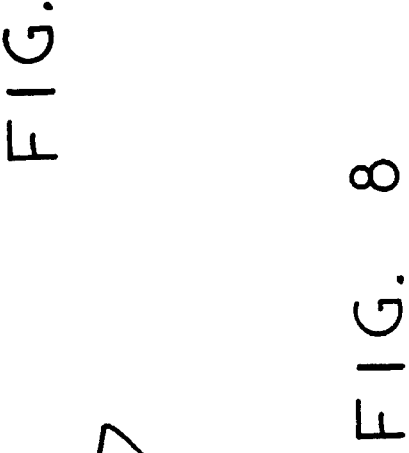
FIG. 8 is a transverse plan view, taken on line 8—8 of FIG. 6, and on the same scale, illustrating only the wear ring of the alternative embodiment.
Figure 6:
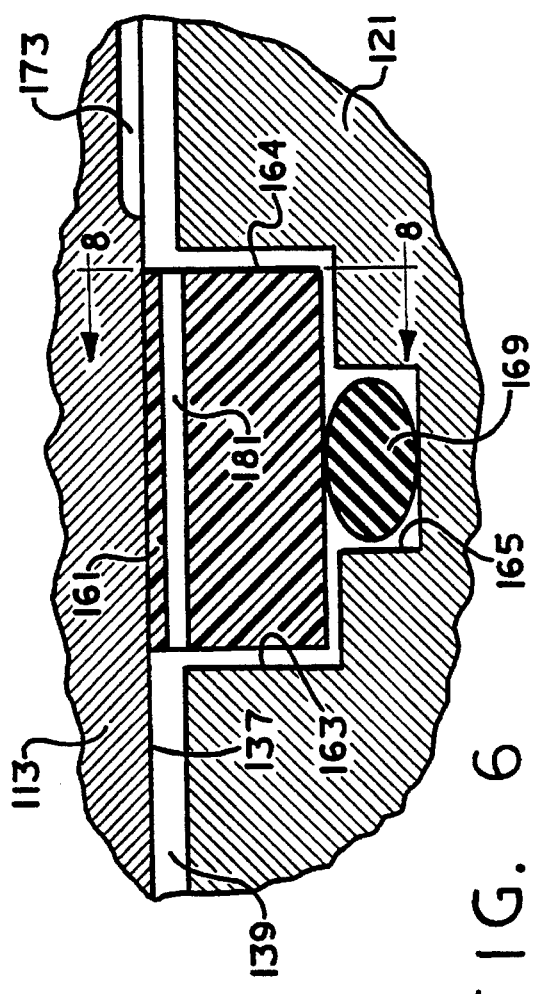
FIG. 6 is an enlarged, fragmentary, axial cross-section, similar to FIG. 4, and on the same scale, illustrating an alternative embodiment of the present invention.

Referring now to FIGS. 6 through 8, an alternative embodiment of the present invention will be described, wherein elements which are the same or similar to those described in connection with FIGS. 1 through 5 will bear the same reference numeral, plus 100, and new elements will bear reference numerals beginning with "173".

Many of the cylinders of the type to which the present invention relates are of the type known as "rephasing" cylinders. Rephasing cylinders are now well known to those skilled in the art, and may be better understood by reference to U.S. Pat. No. 3,832,852, assigned to one of the assignees of the present invention, and incorporated herein by reference. In FIG. 6, the piston 121 is illustrated in a position immediately adjacent the bearing 17, i.e., the piston is at the end of its stroke, with the piston rod 23 fully extended. When the piston member 121 is fully extended, there is, disposed adjacent the wear ring 161, one or more rephasing grooves 173, defined by the interior, cylindrical surface 137 of the barrel 113. Typically, the rephasing grooves 173 would "bridge" or traverse the main piston seal assembly (items 55, 57, and 59). Therefor, at the end of the stroke of the piston 121, a small amount of fluid is able to be communicated from the head end fluid chamber 39 around the piston seal member 55, to the rod end fluid chamber 43, and from there, to a downstream, associated cylinder, such that the two cylinders are "rephased", i.e, both in the fully extended position.

It has been found during the development of the cylinder and wear ring assembly of the present invention that, if contaminant particles are of a certain size, the particles can become lodged in the rephasing groove 173, with the result that such particles cut the seal member 55 as it moves axially with the piston member 121, relative to the lodged particle.

The embodiment shown in FIGS. 6 through 8 is being developed in an attempt to overcome the above-described problem. In order to prevent the passage of particles which can lodge in the rephasing grooves 173, the angled gap 71 of the primary embodiment is replaced by a step-cut in the wear ring 161. Referring primarily to FIG. 7, with the use of a step-cut, the two ends of the wear ring 161 define a narrow, axially-extending gap 175, and another narrow, axially-extending gap 177. Disposed between the gaps 175 and 177, the ends of the wear ring 161 are in abutting engagement along a circumferentially-extending engagement region 179, thus preventing the passage of particles from one axial end of the wear ring to the other. It should be understood that step-cuts are generally well known to those skilled in the art for use in such items as wear rings.

Referring now primarily to FIGS. 6 and 8, the wear ring 161 defines a series of small holes 181 which may be either molded into the wear ring 161, or machined therethrough. There are two key criteria for selecting and locating the holes 181. First, the holes must be small enough so that they will not permit the passage of any contaminant particles which are large enough to become lodged in the rephasing grooves 173. Based upon that determination of the size (diameter) of the holes 181, the number of holes distributed about the circumference of the ring 161 must be selected such that their total flow area is large enough to pass the fluid required to permit rephasing of the cylinders within a satisfactory period of time. Referring to FIG. 6, it should be noted that the holes 181 must be located radially outward far enough such that flow through the holes 181 is not blocked by the surface of the annular groove 163 as the wear ring 161 is biased to the right in FIG. 6 by pressurized fluid in the head end fluid chamber 139.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A linear hydraulic cylinder of the type including a cylinder barrel, first closure means cooperating with said cylinder barrel to define a head end and a fluid inlet port, second closure means cooperating with said cylinder barrel to define a rod end and a fluid outlet port; a piston assembly reciprocally disposed within said cylinder barrel for movement over substantially the entire axial length of the cylinder barrel, said piston assembly including a piston cooperating with an interior, cylindrical surface of said cylinder barrel and said first and second closure means to define a head end fluid chamber and a rod end fluid chamber, said piston assembly further including a rod member fixed to said piston and extending through a rod opening in said second closure means; said piston including an outer, generally cylindrical surface closely spaced apart from said interior surface of said cylinder barrel, said outer cylindrical surface defining first and second annular grooves being disposed adjacent said head end and said rod end fluid chambers, respectively, a wear ring being disposed in said first annular groove, and a seal assembly being disposed in said second annular groove; characterized by:

(a) said wear ring comprising a generally annular, split ring member defining a substantially cylindrical outer surface bounded by a pair of substantially square corners; and
   (b) a loader member disposed in said first annular groove and operable to bias said wear ring into sufficiently tight engagement with said interior, cylindrical surface of said cylinder barrel substantially to prevent passage of contaminant particles between said interior surface and said wear ring.

2. A linear hydraulic cylinder as claimed in claim 1, characterized by said wear ring comprising a molded member, having its cylindrical outer surface and axial end surfaces machined to form said substantially square corners.

3. A linear hydraulic cylinder as claimed in claim 1, characterized by said wear ring comprising a fiberglass-filled, molded member.

4. A linear hydraulic cylinder as claimed in claim 1, characterized by said wear ring comprising a polyamide molded member.

5. A linear hydraulic cylinder as claimed in claim 1, characterized by said loader member comprising an O-ring member disposed in an annular groove opening into said first annular groove having said wear ring disposed therein.

6. A linear hydraulic cylinder as claimed in claim 1, characterized by said wear ring comprising a split ring member having a step-cut including a pair of axially-extending gaps and a circumferentially-extending region of abutting engagement.

7. A linear hydraulic cylinder as claimed in claim 6, characterized by a cylinder barrel defining at least one rephasing groove disposed adjacent said second closure means, said wear ring defining a plurality of holes operable to permit the passage of fluid from said head end fluid chamber into said rephasing groove.

\* \* \* \* \*